United States Patent [19]

Vanderlaan et al.

[11] Patent Number: 4,918,120

[45] Date of Patent: Apr. 17, 1990

[54] LOW STYRENE EMISSION UNSATURATED POLYESTER RESINS

[75] Inventors: Douglas G. Vanderlaan; Wolfgang C. Forster, both of Jacksonville, Fla.

[73] Assignee: Reichhold Chemicals, Inc., White Plains, N.Y.

[21] Appl. No.: 151,836

[22] Filed: Feb. 3, 1988

[51] Int. Cl.$^4$ .......................... C08K 5/01; C08K 5/10; C08L 67/06

[52] U.S. Cl. .................................... 523/465; 523/511; 525/31

[58] Field of Search .................. 523/511, 465; 525/31

[56] References Cited

U.S. PATENT DOCUMENTS

| | | | |
|---|---|---|---|
| 4,387,171 | 6/1983 | Russell | 523/518 |
| 4,609,693 | 9/1986 | Schols | 523/465 |
| 4,619,953 | 10/1986 | Schols | 523/465 |

Primary Examiner—C. Warren Ivy
Attorney, Agent, or Firm—Rodman & Rodman

[57] ABSTRACT

A composition for reducing styrene monomer emissions in DCPD resins, while maintaining good interlaminate adhesion, comprising, (a) 0.001 to 1.0% by weight of a paraffin,
(b) 0.001 to 3.0% by weight of an intermediate bonding promoter comprising the reaction product of
  (i) a saturated or unsaturated fatty acid containing 5 to 30, and preferably 10 to 20 carbon atoms,
  (ii) a mono- or diepoxy compound,
(c) 0.0 to 10% by weight of alpha-methyl styrene, and
(d) 0.0 to 1.0% by weight of a copper salt, wherein said composition results in styrene emission rates of 60 grams/square meter or less measured one hour after gelation, and retains at least 80% to 90% of the interlaminate adhesion properties of an unmodified resin.

14 Claims, No Drawings

LOW STYRENE EMISSION UNSATURATED POLYESTER RESINS

BACKGROUND OF THE INVENTION

1. Field of the Invention

This invention relates to a composition and method for reducing styrene emissions from unsaturated polyester resins during cure, while maintaining good interlaminate adhesion, particularly in resins made with dicyclopentadiene (DCPD), or blends containing such resins.

2. Description of the Prior Art

Unsaturated polyester resins used to make molded articles are typically the reaction products of dicarboxylic acids and glycols, blended with an ethylenically unsaturated monomer such as styrene. These resins are cured by the addition of an initiator which decomposes to generate free radicals, which in turn activate the cross linking of the styrene monomer with reactive unsaturated groups in the polyester. From the time that such resins are supplied to a mold, until they are thoroughly cured, styrene vapors are emitted from the resin.

It is known that the amount of styrene emitted from the polyester as a resin during cure can be reduced by the addition of small amounts of paraffins to the resin. The paraffins reduce styrene emissions by forming a continuous film on the surface of the resin. The extent of the reduction of styrene emission depends upon the type and level of paraffin used, as well as the resin composition and curing characteristics. It is often possible to reduce styrene emissions by 80 to 90%.

The addition of paraffins to unsaturated polyesters, however, often substantially diminishes the adhesion between successive laminate layers, thus reducing the strength of molded articles made by multilaminate construction. It is known that the addition of adhesion promoters to the resin can offset the reduction in interlaminate adhesion.

Adhesion promoters which have been used include surface active agents which have chemical structures which contain a hydrocarbon chain segment and a relatively more polar segment which includes aromatic and hydroxyl functionalities. An example of such a compound is a bis-hydroxyl bis-ester, which is the reaction product of a fatty acid with bisphenol A diglycidyl ether, having the following structure:

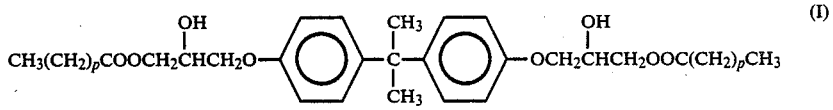

(I)

wherein p varies from about 5 to 30.

A distinct type of unsaturated polyester is formed by reacting maleic anhydride with one or more glycols, or optionally with water, and reacting the resultant carboxylic acd end groups in an addition reaction with DCPD. These resins, which are often referred to as DCPD resins, can be used as molding resins per se, or in blends with conventional unsaturated polyesters, and have the advantage of curing with reduced shrinkage, thereby giving smooth laminate surfaces.

While the styrene emission levels of DCPD resins can be reduced by the addition of paraffins, the addition of commercially available blends of paraffins and interlaminate bond promoters such as compound (I) yield resins which permit relatively high levels of styrene upon curing.

Public awareness for the need to reduce volatile organic compound (VOC) emissions from polyester resin operations is being voiced by various governmental bodies proposing more stringent controls. The South Coast Air Quality Management Board of El Monte, Calif., were particularly concerned with styrene emmissions in their Staff Report on Jan. 23, 1987, which discussed proposed rules to control such emissions.

Heilmann et al, "Styrene Emission Control Without Interlaminate Adhesion Loss—A New Additive for Unsaturated Polyester", 41st Annual Conference, Reinforced Plastics/Composites Institute, The Society of The Plastics Industry, Inc., Jan. 27–31, 1986, disclose a low styrene emission (LSE) agent identified as "BYK LP-X-5500" which is referred to as a combination of a specific paraffin with a bonding and dispersing agent.

A brochure published by BYK Chemie USA, Wallingford, Conn., U.S.A., "Additive for Reducing Styrene Monomer Emission in Unsaturated Polyester and Vinyl Ester Resins", (September 1986) discloses that manufacturers are being increasingly faced with governmental regulations concerning both environmental and worker health hazards. In the unsaturated polyester industry, strict limits on allowable styrene monomer vapor in the workplace have been established in many countries.

The BYK brochure further describes a line of proprietory additives, namely, "BYK-S-740" for reducing styrene monomer emission.

Japanese Kokai 60/49056 discloses a fiber reinforced unsaturated polyester exhibiting low monomer evaporation during storage and resulting in a laminate with high delamination strength.

Netherlands Application 80/3167 relates to suppression of monomer volatility in unsaturated polyesters by addition of $C_{12}$ to $C_{22}$ alkanoic acid esters of propoxylated phenols, propoxylated bisphenols or hydroxypropyl phthalates.

Nylander in "Development of a Resin System to Reduce Styrene Evaporation", Section 6-B, pages 1–8 (34th Annual Technical Conference, 1979, Reinforced Plastics/Composites Institute, The Society of the Plastics Industry, Inc.) describes reducing styrene vapor concentration in workshops by utilizing an orthophthalic/maleic acid resin with fumed silica and various additives to reduce styrene evaporation from resins.

Walewski et al in "Field Testing of Low Styrene Emission (LSE) Polyester Laminating Resins", Session 1-C, pages 1–4 (40th Annual Conference, 1985, Reinforced Plastics/Composites Institute, The Society of the Plastics Industry, Inc.) disclose methods for environmental testing of low styrene emission resins and the use of a new resin whose identity is not revealed.

Other patents of interest include U.S. Pat. No. 3,640,977 to Gonzenbach et al; U.S. Pat. No. 4,010,130 to Matsuo et al; U.S. Pat. No. 3,832,314 to Hoh et al; U.S. Pat. No. 3,959,062 to Hoh et al; U.S. Pat. No. 3,941,904 to Hoh et al; U.S. Pat. No. 3,583,936 to Stahl; U.S. Pat. No. 3,911,185 to Wright, Jr.; U.S. Pat. No.

4,072,808 to Lakshmanan et al; U.S. Pat. No. 4,352,749 to Osaka; U.S. Pat. No. 4,360,622 to Tsuchiya et al; U.S. Pat. No. 4,513,130 to Mizui et al; and U.S. Pat. No. 4,625,008 to Fischer.

SUMMARY OF THE INVENTION

The present invention provides a means for reducing the styrene emission levels of unsaturated polyester resins made with DCPD, or blends containing DCPD resins, while retaining good interlaminate adhesion properties.

More specifically, the present invention provides a composition for reducing styrene monomer emissions in DCPD resins, while maintaining good interlaminate adhesion, comprising
(a) about 0.001 to 1.0% by weight of a paraffin,
(b) about 0.001 to 3.0% by weight of an interlaminate bonding promoter comprising the reaction product of
 (i) a saturated or unsaturated fatty acid containing 5 to 30, and preferably 10 to 20 carbon atoms,
 (ii) a mono- or diepoxy compound,
(c) about 0.0 to 10% by weight of alpha-methyl styrene, and
(d) about 0.0 to 1.0% by weight of a copper salt.

It has been found that this composition effectively reduces the styrene emission rate to about 60 grams/square meter or less, measured, one hour after gelation. It has also been found that the composition retains at least 80 to 90%, and preferably at least 95% of the interlaminate adhesion properties of an unmodified resin.

The present invention also relates to a method for reducing styrene monomer emissions in unsaturated polyester resin compositions comprising DCPD resins, while maintaining good interlaminate adhesion. The method comprises contacting the resin with the above described composition prior to curing to effectively reduce styrene monomer emissions to achieve a styrene emission rate of about 60 grams/square meter or less, measured one hour after gelation.

DESCRIPTION OF THE PREFERRED EMBODIMENTS

In accordance with the present invention, it has been found that blending DCPD resins with certain levels of paraffin and interlaminate bonding promoters, and optionally with peak exotherm reducers, such as alpha-methylstyrene or certain copper salts, gives rise to DCPD resins which cure with reduced levels of styrene emission, while retaining good interlaminate adhesion properties.

According to the invention, DCPD resins or blends containing DCPD resins are contacted with the following low styrene emission (LSE) composition:
(a) about 0.001 to 1.0% by weight, preferably 0.01 to 0.8% by weight and more preferably 0.03 to 0.3% by weight of a paraffin having 15 to 100 carbon atoms, preferably having 20 to 34 carbon atoms.
(b) about 0.001 to 3.0% by weight of an interlaminate bonding promoter, preferably 0.01 to 2.0% by weight of the bonding promoter and more preferably 0.1 to 1.0% by weight of the bonding promoter, the promoter being composed of the reaction product of
(i) a saturated or unsaturated fatty acid containing 5 to 30, and preferably 10 to 20 carbon atoms,
(ii) a mono- or diepoxy compound such as, for example, phenyl glycidyl ether, bisphenol A diglycidyl ether, diglycidyl isophthalate, diglycidyl phthalate, diglycidyl ether of hydrogenated bisphenol A, diglycidyl ether of resorcinol, and diglycidyl ethers of bisphenol A having the following structure:

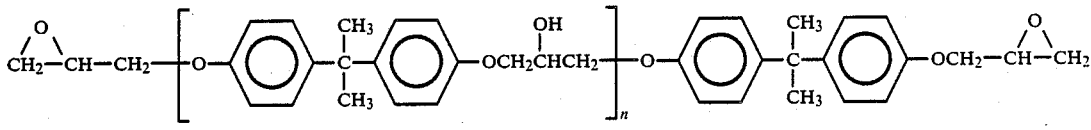

wherein n=0 to 20 and when n=0, the structure becomes bisphenol A diglycidyl ether.
(c) about 0.0 to 10% by weight, preferably about 1 to 5% by weight, of alpha-methyl styrene, and
(d) about 0.0 to 1.0% by weight, preferably 0.1 to 0.3% by weight, of a copper salt. Copper salts that can be employed in the invention include copper napthenate and copper octanoate.

The DCPD resins of the present invention can be unsaturated polyester resins made with DCPD or blends of such resins with conventional polyester resins wherein the resins made with DCPD constitute about 20 to 100%, preferably about 35 to 80% and most preferably about 45 to 70% by weight of the total resin.

Fatty acids which can be used include lauric myristic, palmitic, stearic, arachidic, palmitoleic, oleic, ricinoleic, capric, caproic, linoleic, linolenic, cerotic, and mixtures thereof.

The weight ratio of interlaminate bonding promoter to the paraffin is about 5:1 to 1:5, and preferably about 3:1 to 1:3. If the ratio is too high, the styrene emission increases. If the ratio is too low, then insufficient interlaminate bonding results. By operating within the specified ranges and using the appropriate ratio of interlaminate bonding promoter to paraffin, it is possible to provide a resin which significantly reduces styrene emissions, while maintaining good interlaminate adhesion properties.

The inventive low styrene emission composition can reduce styrene emissions to a level of about 60 grams/meters$^2$ or less measured one hour after gelation, preferably about 10 to 55 grams/square meter or less measured one hour after gelation. In the context of this invention, gelation occurs when the material no longer flows.

The low styrene emission composition has also been found to retain good interlaminate adhesion properties in the resin, at levels of at least about 80 to 90%, and preferably at least 95% of the interlaminate adhesion properties of the unmodified resin, that is, without the low styrene emission composition.

The interlaminate bonding promoters suitable for use in the low styrene emission composition can be produced by heating an appropriate epoxy compound with an appropriate fatty acid at about 90°-200° C., preferably about 130° to 180° C. for about 2 to 15 hours, preferably about 6 to 10 hours. Optionally, the promoters can be produced in the presence of a catalyst, such as for example, tetramethylammonium chloride, tetraethylammonium chloride, tetramethylammonium bromide, tetraethylammonium bromide or triphenylphosphine. The relative amounts of carboxylic acid to epoxy can vary in a molar ratio of carboxylic acid to epoxy functionality of about 0.5:1.0 to 2.0:1.0, preferably about 0.8:1.0 to 1.2:1.0.

Paraffins suitable for use in the present invention include, for example, long chain alkanes with melting points ranging from about 40° C. to 80° C., preferably about 50° C. to 75° C.

In formulating the LSE composition, the paraffin, and interlaminate bonding promoter, which can be a waxy solid or a viscous liquid at room temperature, can be added to the resin by heating them to above their melting points with styrene or other suitable organic solvent such as toluene or xylene and adding the resulting solution to the stirred resin. It is frequently necessary to heat the resin to about 50°–80° C. to ensure complete dissolution of the additives.

An effective amount of the low styrene emission composition can be added to a resin composition comprising dicyclopentadiene and styrene prior to curing. The amount of the LSE composition is that which effectively reduces styrene monomer emissions to a rate of about 60 grams/square meter or less measured one hour after gelation.

Specific applications for low styrene emission resins produced according to the present invention include the manufacture of boat hulls and other molded articles produced by open mold processes.

The following examples illustrate, but do not limit the scope of the invention which is defined by the claims. All parts and percentages are by weight, unless otherwise indicated.

EXAMPLE 1

A blend of 426 parts of stearic acid, 293 parts of bisphenol A glycidyl ether, and 1.0 part of a 10% aqueous solution of tetramethyl ammonium chloride were heated at 140° C. for 8 hours, forming a diester product which hardened to a waxy off-white solid upon cooling. This composition formed the interlaminate bonding promoter.

EXAMPLE 2

An unsaturated polyester resin was made with dicyclopentadiene by charging four successive 124 gram portions of water to a mixture of 3814 grams of dicyclopentadiene and 2496 grams of maleic anhydride in a round bottomed reaction flask at an initial temperature of 95°–98° C., and controlling the temperature so that it did not exceed 125° C. Hydroquinone (0.84 grams) and ethylene glycol (853 grams) were then charged to the flask, and the resulting mixture was heated with stirring to a maximum temperature of 215° C., with distillation of water, until an acid number of 30 milligrams KOH/gram was reached. The mixture was then cooled to 150° C. and blended with 2550 grams of styrene inhibited with 0.8 grams hydroquinone and 0.8 grams tert. butylcatechol.

EXAMPLE 3

An unsaturated polyester resin was made by combining 2771 grams of propylene glycol with 3333 grams of phthalic anhydride and 1103 grams of maleic anhydride, which was heated and stirred to a maximum temperature of 215° C. with distillation of water until an acid number of 20 milligrams KOH/gram was reached. The mixture was cooled to 150° C. and blended with 3150 grams of styrene inhibited with 0.23 grams tert. butylcatechol, 0.15 grams parabenzoquinone and 0.2 grams hydroquinone.

EXAMPLE 4

To a blend of 5270 grams of the dicyclopentadiene resin from Example 2 and 3513 grams of the orthophthalic resin from Example 3 was added 90 grams of fumed silica and 20 grams of a dispersing agent, Tween 20 (ICI Americas). The resulting blend was mixed under high shear conditions for about 20 minutes until a thixotropic index of approximately 3.0 was obtained. The resulting resin was then inhibited and promoted for room temperature cure by the addition of 18 grams of cobalt octoate, 8.0 grams of N,N-diethylaniline, 0.4 grams of copper napthenate, 100 grams of alpha methylstyrene, 2.0 grams of triethanol amine and 0.30 grams of mono-tert-butylhydroquinone with 1000 grams of styrene.

EXAMPLE 5

A low styrene emission resin was made by combining 0.15 parts of "Paraffin 1245" (International Waxes, Ltd.), 3.0 parts of alpha methylstyrene and 0.3 parts of the interlaminate bonding promoter from Example 1 with 100 parts of the resin from Exammple 4 heated to 65° C.

The styrene emission of each sammple was measured by catalyzing 110 grams of the resin/additive blend with 1.1 grams of catalyst 46–709, a methyl ethyl ketone peroxide solution from Reichhold Chemicals, Inc., Jacksonville, Fla., U.S.A. and pouring 100 grams of the catalyzed blend into an inverted one gallon can lid with a diameter of 15 centimeters. One hour after gelation, each can lid was reweighed, and the styrene loss in grams per square meter one hour after gelation was calculated. The test was carried out at 25° C.

In order to measure interlaminate bonding, a 6 inch by 6 inch laminate was made with three layers of 1.5 ounce fiberglass chopped strand mat. After the first laminate was allowed to cure for 24 hours at room temperature, a second similar laminate was applied on top thereof. A one-inch strip of Mylar ® (Dupont Co.) was inserted along the top edge before laying up the second laminate to facilitate splitting of the laminates. After remaining at room temperature for 48 hours, the laminates were split apart by driving a wedge between them using a Tinius Olsen testing machine on the 300 pound scale at a crosshead speed of 2.0 inches per minute. The force required to split the laminates was then measured in pounds.

An additional evaluation of the interlaminate adhesion was made by visually inspecting the exposed surfaces from the separated laminates. Where the interlaminate adhesion was poor, separation occurred at the resin-to-resin interface, leaving a surface free of exposed glass fibers. Where the interlaminate adhesion was strong, splitting occurred at the resin-to-resin interface, thereby exposing glass fibers at the surface.

The styrene emission and interlaminate bonding results are contained in Table 1, which follows:

TABLE 1

| STYRENE | WITHOUT LOW STYRENE EMISSION RESIN | WITH LOW STYRENE EMISSION RESIN |
|---|---|---|
| Paraffin (weight %) | 0.0 | 0.15 |
| Adhesion Promoter (weight %) (from Example 1) | 0.0 | 0.30 |
| Styrene Emission (grams/square meter one hour after gelation) | 103 | 18 |
| Interlaminate Adhesion (lbs.) | 41 | 38 |

EXAMPLE 6

Using the procedure described in Example 5, the styrene emission with varying amounts of a commercial styrene ("BYK S-740" of BYK Chemie USA, Wellingford, CT, USA) emission reducing additive was measured. The results appear in Table 2 as follows:

TABLE 2

| STYRENE EMISSION WITH BYK S-740 | | | |
|---|---|---|---|
| Weight % of Additive | 0.5 | 1.0 | 1.5 |
| Styrene Emission (grams/square meter measured one hour after gelation) | 98 | 90 | 86 |

What is claimed is:

1. A dicyclopentadiene resin composition having reduced styrene monomer emissions, while maintaining good interlaminate adhesion, comprising the following components in % by weight of the total resin composition:
   (a) about 0.001 to 1.0% by weight of a paraffin having a melting point of about 40° to 80° C.;
   (b) about 0.001 to 3.0% by weight of an interlaminate bonding promoter comprising the reaction product of
      (i) a saturated or unsaturated fatty acid containing about 5 to 30 carbon atoms,
      (ii) a mono- or diepoxy compound, wherein said reaction occurs at about 90° to 200° C., and wherein the relative amounts of fatty acid to epoxy vary in a molar ratio of fatty acid to epoxy functionality of about 0.5:1.0 to 2.0:1.0, respectively, and wherein the weight ratio of interlaminate bonding promoter to the paraffin is about 5:1 to 1:5;
   (c) about 0.0 to 10% by weight of alpha-methyl styrene,
   (d) about 0.0 to 1.0% by weight of a copper salt,
   (e) the remainder comprising styrene and an unsaturated polyester resin made with dicyclopentadiene, and wherein said composition results in styrene emission rates of 60 grams/square meter or less measured one hour after gelation, and retains at least 80% to 90% of the interlaminate adhesion properties of an unmodified resin.

2. The composition of claim 1, wherein said fatty acid contains about 10 to 20 carbon atoms.

3. The composition of claim 1, wherein the weight ratio of the intermediate bonding promoter to the paraffin is 3:1 to 1:3.

4. The composition of claim 1, wherein the intermediate bonding promoter is produced by heating the mono- or diepoxy compound and the fatty acid at 90° C. to 200° C. for 0.5 to 10 hours.

5. The composition of claim 1, wherein the reaction of the fatty acid and the mono- or diepoxy compound is conducted in the presence of a catalyst selected from the group consisting of tetramethylammonium chloride, tetraethylammonium chloride, tetramethylammonium bromide, tetraethylammonium bromide and triphenylphosphine.

6. The composition of claim 1, wherein the paraffin has 15 to 100 carbon atoms.

7. The composition of claim 1, wherein the paraffin has 20 to 34 carbon atoms.

8. The composition of claim 1, wherein the paraffin is a long chain alkane having a melting point of about 40° C. to 80° C.

9. The composition of claim 1, wherein the mono- or diepoxy compound is selected from the group consisting of phenyl glycidyl ether, diglycidyl isophthalate, diglycidyl phthalate, diglycidyl ether of hydrogenated bisphenol A, diglycidyl ether of resorcinol, and diglycidyl ethers of bisphenol A having the following structure:

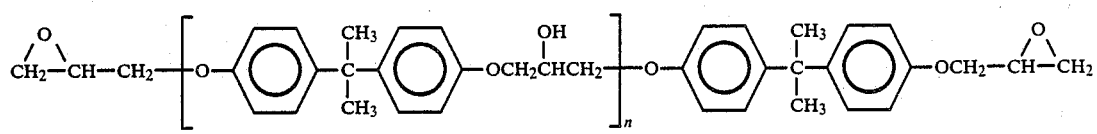

wherein n=0 to 20.

10. The composition of claim 1, wherein the fatty acid is selected from the group consisting of lauric acid, myristic acid, palmitic acid, stearic acid, arachidic acid, palmitoleic acid, oleic acid, ricinoleic acid, capric acid, caproic acid, cerotic acid, linoleic acid, linolenic acid, and mixtures thereof.

11. A method for reducing styrene monomer emissions in unsaturated polyester resin compositions comprising dicyclopentadiene resins and styrene, while maintaining good interlaminate adhesion, comprising adding to the resin composition, prior to curing, an effective amount of a composition to reduce styrene monomer emissions to a rate of about 60 grams/square meter or less, measured one hour after gelation, wherein the resin composition retains at least 80 to 90% of the interlaminate adhesion properties of an unmodified resin, said composition comprising, in % by weight of the total dicyclopentadiene resin composition:
   (a) about 0.001 to 1.0% by weight of a paraffin, having a melting point of about 40° to 80° C.;
   (b) about 0.001 to 3.0% by weight of an interlaminate bonding promoter comprising the reaction product of
      (i) a saturated or unsaturated fatty acid containing about 5 to 30 carbon atoms,
      (ii) a mono- or diepoxy compound, wherein said reaction occurs at about 90° to 200° C., and wherein the relative amounts of fatty acid to epoxy vary in a molar ratio of fatty acid to epoxy functionality of about 0.5:1.0 to 2.0:1.0, respectively, and wherein the weight ratio of interlaminate bonding promoter to the paraffin is about 5:1 to 1:5;

(c) about 0.0 to 10% by weight of alpha-methyl styrene, (d) about 0.0 to 1.0% by weight of a copper salt.

12. The method of claim 11, wherein the paraffin and interlaminate bonding promoter are heated above their melting points and the resultant solution is contacted with the resin composition.

13. The method of claim 11, wherein the resin is heated sufficiently to completely dissolve the paraffin and interlaminate bonding promoter.

14. The method of claim 11, wherein said fatty acid contains about 10 to 20 carbon atoms.

* * * * *